(No Model.)

A. B. CARTER.
WHEEL AND AXLE COUPLING.

No. 301,478. Patented July 8, 1884.

Witnesses.
S. N. Piper
E. A. Pratt

Inventor,
Alba Briggs Carter.
by R. H. Eddy, atty

UNITED STATES PATENT OFFICE.

ALBA BRIGGS CARTER, OF GREAT FALLS, ASSIGNOR OF ONE-HALF TO SOLOMON H. ATKINS, OF MILTON MILLS, AND CHARLES W. PRESCOTT, OF RAYMOND, NEW HAMPSHIRE.

WHEEL AND AXLE COUPLING.

SPECIFICATION forming part of Letters Patent No. 301,478, dated July 8, 1884.

Application filed December 11, 1883. (No model.)

*To all whom it may concern:*

Be it known that I, ALBA BRIGGS CARTER, of Great Falls, in the county of Strafford, of the State of New Hampshire, have invented a new and useful Improvement in Carriage Wheel and Axle Couplings; and I do hereby declare the same to be described in the following specification and represented in the accompanying drawings, of which—

Figure 1:
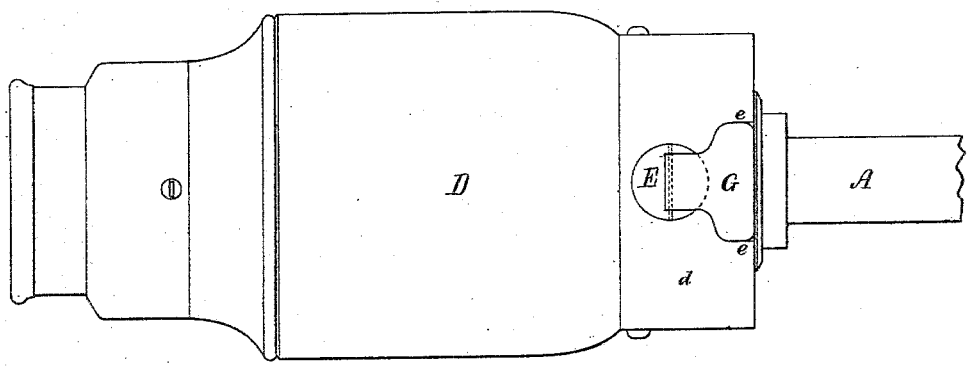
Figure 2:
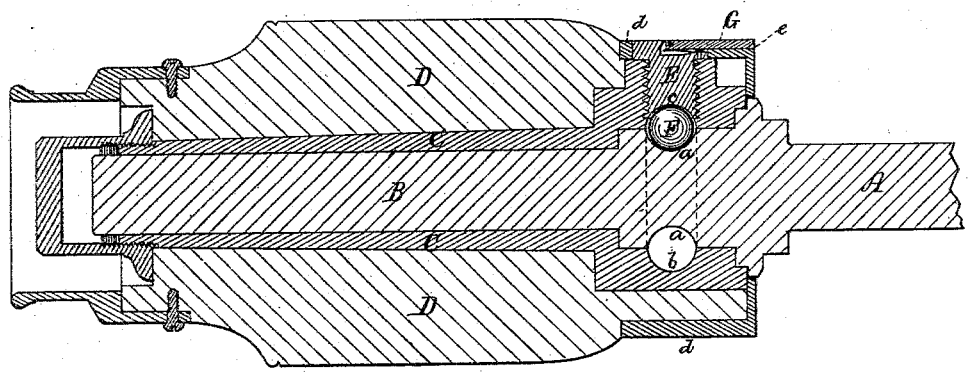

Figure 1 is a top view, and Fig. 2 a longitudinal section, of a wheel-hub and part of an axle with my invention applied thereto, the nature of such invention being defined in the claims hereinafter presented.

The improvement relates to means for coupling the wheel-hub to the axle.

In the drawings, A denotes part of the axle, with a journal, B, extending therefrom, while C is the metallic sleeve of the hub D, such sleeve being closed at its outer and open at its inner end. Within the neck of the journal, and extending around it, is a groove, $a$, which in transverse section is semicircular or the lesser arc of a circle. Around this groove, and in the sleeve, is another such groove, $b$, which is designed to hold oil.

In the groove $a$, and also in a cup-shaped or spherical segmental recess or socket, $c$, in a screw, E, screwed laterally into the sleeve, there is placed a spherical ball, F. There is hinged to the head of the said screw a flat handle, G, the head being rabbeted to receive it, and allow it, when turned down, to be flush with the outer end of the head.

In the rear collar, $d$, of the hub is a recess, $e$, to receive and fit to the handle when the latter is turned down, and to cause it to be flush with the outer surface of the collar. This handle and recess are to prevent the screw from becoming accidentally unscrewed. There may be properly applied to the handle and the collar a spring for holding such handle down in place in the recess, or preventing it from accidentally working out of such while the wheel may be in revolution. On turning the handle upward it may be used for revolving the screw, whether for unscrewing it for the removal of the ball out of the groove $a$ to be effected, or for screwing the screw down to place to hold the ball in the recess of the screw and in the groove $a$. While the wheel-hub may be revolving, the ball will revolve in the groove $a$ and the recess of the screw, and such ball will, with the screw and the groove $a$, keep the hub coupled to the axle. Preparatory to removing the hub from the axle it will only be necessary to turn back the screw far enough for the ball to pass out of the groove $a$, when the wheel-hub is turned around so as to carry the screw into its lowest position, or underneath the journal. On the screw being removed from the sleeve oil can be supplied through the screw-hole to the oil-chamber or groove $b$, and to the bearing-surface of the sleeve and journal, as occasion may require. Were the screw simply grooved diametrically across its lower end instead of having a cup-shaped recess to receive the ball, it would not retain the ball, which would be liable to become choked in the groove of the journal, so as to render it difficult for it to be carried around by the sleeve in order to fall by gravity out thereof on the removal of the screw from the sleeve, and the sleeve being revolved so as to carry the screw-hole to its lower vertical position. With the spherical segmental or cup-shaped recess in the screw the ball is always retained in the said recess while the screw is in place in the hub and the latter may be revolving, the ball revolving at the time in the screw. With the cup-shaped recess the ball can be readily carried around directly underneath the journal, so as to drop out of it and the hub on the removal of the screw from the latter. The groove $b$ in the sleeve serves with the groove $a$ as a reservoir of oil for the ball and its recess in the screw, and also for the sleeve and journal; and, besides, it enables one or more other balls to be used when desirable, in which case such ball or balls would be in both the grooves $a$ and $b$, and be forced around in such by the ball F, while the hub might be revolving.

I claim—

1. The combination of the ball and the screw provided with the spherical segmental or cup-shaped recess, as described, to receive such ball, with the wheel-hub sleeve, and with the